United States Patent
Suciu et al.

(10) Patent No.: US 9,038,367 B2
(45) Date of Patent: May 26, 2015

(54) FAN CASE THRUST REVERSER

(75) Inventors: Gabriel L. Suciu, Glastonbury, CT (US); Brian D. Merry, Andover, CT (US); Allan R. Penda, Amston, CT (US); Christopher M. Dye, Glastonbury, CT (US); Jay Bhatt, Bryan, TX (US)

(73) Assignee: United Technologies Corporation, Hartford, CT (US)

( * ) Notice: Subject to any disclaimer, the term of this patent is extended or adjusted under 35 U.S.C. 154(b) by 922 days.

(21) Appl. No.: 13/234,213

(22) Filed: Sep. 16, 2011

(65) Prior Publication Data

US 2013/0067885 A1  Mar. 21, 2013

(51) Int. Cl.
  *F02K 1/72* (2006.01)
  *F02K 1/70* (2006.01)
  *F02K 1/12* (2006.01)

(52) U.S. Cl.
  CPC ... *F02K 1/70* (2013.01); *F02K 1/12* (2013.01); *F02K 1/72* (2013.01); *F02K 1/1207* (2013.01); *F05D 2250/25* (2013.01)

(58) Field of Classification Search
  CPC .............. F02K 1/09; F02K 1/11; F02K 1/12; F02K 1/1207; F02K 1/1253; F02K 1/54; F02K 1/64; F02K 1/70; F02K 1/72; F05D 2240/129; F05D 2270/051
  USPC .......... 60/226.1–226.3, 770, 771; 244/110 B; 239/265.29, 265.31, 265.33, 265.37
  See application file for complete search history.

(56) References Cited

U.S. PATENT DOCUMENTS

| | | | |
|---|---|---|---|
| 3,286,784 A | | 11/1966 | Mariner |
| 3,603,090 A | * | 9/1971 | Billinger et al. ............. 60/226.2 |
| 3,747,341 A | * | 7/1973 | Davis ........................... 60/226.2 |
| 4,030,290 A | * | 6/1977 | Stachowiak ................. 60/226.2 |
| 4,030,291 A | | 6/1977 | Sargisson |
| 4,175,385 A | | 11/1979 | Nash |
| 4,391,409 A | | 7/1983 | Scholz |
| 4,858,430 A | | 8/1989 | Belbouche |
| 4,894,985 A | | 1/1990 | Dubois et al. |
| 4,914,905 A | | 4/1990 | Dubois et al. |
| 4,922,712 A | | 5/1990 | Matta et al. |
| 5,046,307 A | | 9/1991 | Matta et al. |
| 5,255,510 A | | 10/1993 | Lardellier |
| 5,259,724 A | * | 11/1993 | Liston et al. ....................... 415/9 |
| 5,267,438 A | | 12/1993 | Bunel et al. |
| 5,297,387 A | | 3/1994 | Carimali et al. |
| 5,315,821 A | * | 5/1994 | Dunbar et al. ................ 60/226.1 |
| 5,507,143 A | * | 4/1996 | Luttgeharm et al. ......... 60/226.2 |
| 5,548,954 A | | 8/1996 | de Cambray et al. |
| 5,615,549 A | | 4/1997 | Valleroy |
| 5,655,360 A | | 8/1997 | Butler |
| 5,725,182 A | | 3/1998 | Valleroy |
| 5,778,660 A | | 7/1998 | Jean |
| 5,782,434 A | | 7/1998 | Jean |
| 5,806,302 A | | 9/1998 | Cariola et al. |
| 5,852,928 A | | 12/1998 | Vauchel |
| 5,863,014 A | | 1/1999 | Standish |
| 5,904,320 A | | 5/1999 | Tindell |
| 5,927,647 A | | 7/1999 | Masters et al. |

(Continued)

*Primary Examiner* — Andrew Nguyen
(74) *Attorney, Agent, or Firm* — Carlson, Gaskey & Olds, P.C.

(57) ABSTRACT

A fan case of a gas turbine engine includes a fan blade containment section defined about an engine axis, a thrust reverser cascade section downstream of the blade containment section and a Fan Exit Guide Vane section downstream of the thrust reverser cascade section.

20 Claims, 8 Drawing Sheets

(56) References Cited

U.S. PATENT DOCUMENTS

| | | | |
|---|---|---|---|
| 6,042,053 | A | 3/2000 | Sternberger et al. |
| 6,050,522 | A | 4/2000 | Brossier et al. |
| 6,079,201 | A | 6/2000 | Jean |
| 6,233,920 | B1 | 5/2001 | Presz, Jr. et al. |
| 6,293,495 | B1 | 9/2001 | Aten et al. |
| 6,434,927 | B1 | 8/2002 | Stretton |
| 6,474,059 | B2 | 11/2002 | Stretton |
| 6,568,172 | B2 | 5/2003 | Jannetta et al. |
| 6,598,386 | B2 | 7/2003 | Johnson et al. |
| 6,666,307 | B1 | 12/2003 | Christensen |
| 6,824,101 | B2 | 11/2004 | Sternberger et al. |
| 6,915,984 | B2 | 7/2005 | Sternberger et al. |
| 7,866,142 | B2 | 1/2011 | Beardsley et al. |
| 2002/0124550 | A1 | 9/2002 | Stretton |
| 2003/0056493 | A1 | 3/2003 | Jannetta et al. |
| 2009/0097967 | A1* | 4/2009 | Smith et al. .................. 415/145 |
| 2009/0288386 | A1 | 11/2009 | Marshall et al. |
| 2010/0005777 | A1 | 1/2010 | Marshall |
| 2010/0212286 | A1* | 8/2010 | West et al. .................. 60/226.2 |
| 2010/0257841 | A1 | 10/2010 | Pero et al. |

\* cited by examiner

FAN CASE THRUST REVERSER

BACKGROUND

The present disclosure relates to a gas turbine engine, and more particularly to a turbofan engine thrust reverser.

Gas turbine engines may include a thrust reverser to redirect engine thrust to reduce landing distance. Thrust reversers are typically articulated doors in a nacelle structure that deploy into a position that obstructs and redirects engine thrust. Clamshell thrust use shells which close together to capture and redirect core engine exhaust. Cascade thrust reversers use a translatable sleeve which forms a rearward outer wall portion of a bypass duct which translates rearwardly to form an outlet with cascade arrays. When the translatable sleeves move rearward upon deployment, blocking doors hinge radially inwardly to block the bypass duct and redirect bypass airflow through the cascade array which redirects the bypass flow.

SUMMARY

A fan case of a gas turbine engine according to an exemplary aspect of the present disclosure includes a fan blade containment section defined about an engine axis. A thrust reverser cascade section downstream of the blade containment section and a Fan Exit Guide Vane section downstream of the thrust reverser cascade section.

A fan section of a gas turbine engine according to an exemplary aspect of the present disclosure includes a thrust reverser cascade within a fan case upstream of a multiple of Fan Exit Guide Vanes.

A gas turbine engine according to an exemplary aspect of the present disclosure includes a fan case and a core case defined about an engine axis. A multiple of Fan Exit Guide Vanes attached to the fan case and the core case. A thrust reverser cascade within the fan case upstream of the multiple of Fan Exit Guide Vanes. A multiple of inner and outer thrust reverser doors adjacent to the thrust reverser cascade. A fan blocker door mounted to each of the multiple of Fan Exit Guide Vanes.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 9 is an enlarged perspective partial sectional view of the thrust reverser in a closed position.

DETAILED DESCRIPTION

Figure 1:
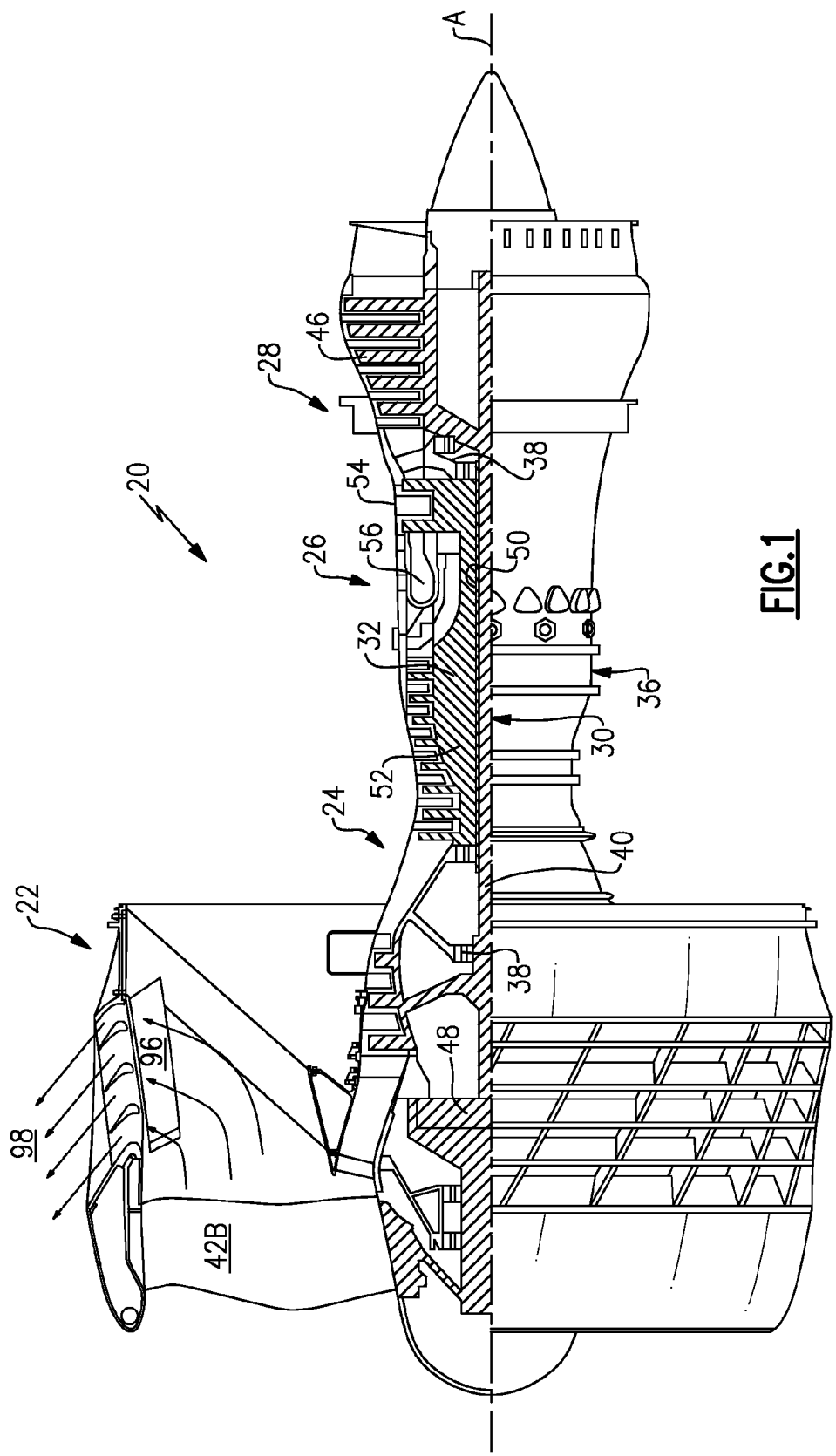
FIG. 1 is a schematic cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 54, 46 rotationally drive the respective low speed spool 30 and high speed spool 32 in response to the expansion.

Figure 2:
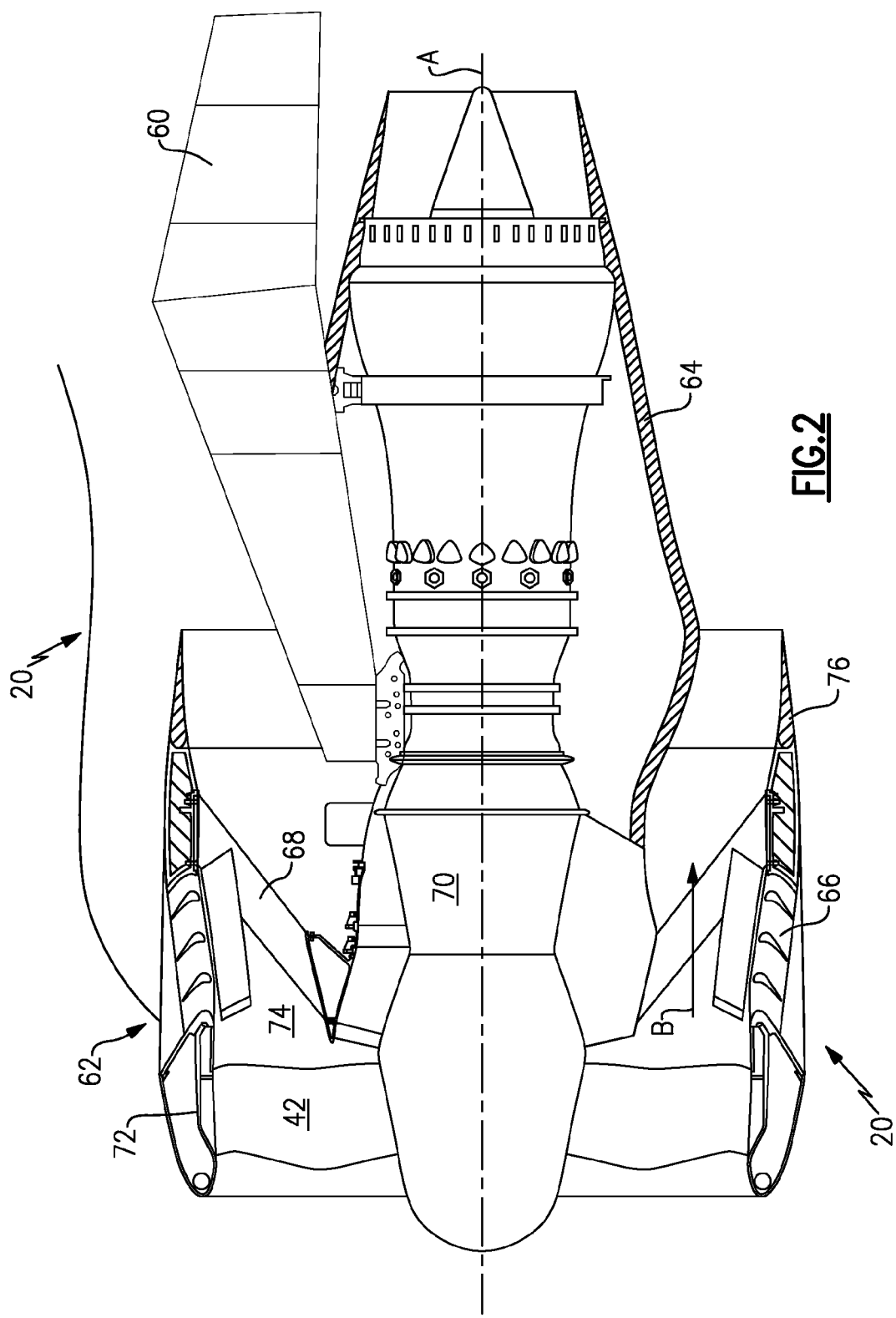
FIG. 2 is a schematic cross-sectional view of the gas turbine engine within a nacelle assembly.

With reference to FIG. 2, the gas turbine engine 20 is mounted to an engine pylon structure 60 within an engine nacelle assembly 62 as is typical of an aircraft designed for subsonic operation. The nacelle assembly 62 generally includes a core nacelle 64 and a fan nacelle 66. The fan nacelle 66 is supported relative to the core nacelle 64 by Fan Exit Guide Vanes (FEGVs) 68 which extend between a core case 70 and a fan case 72. The core case 70 and the fan case 72 are structural members which support the respective fan nacelle 66 and core nacelle 64 which define outer aerodynamic surfaces. The core case 70 is often referred to as the engine backbone and supports the rotational componentry therein. It should be understood that although a particular component arrangement is disclosed in the illustrated embodiment, various pylon structures and nacelle assemblies will benefit herefrom.

An annular bypass flow path 74 is defined between the fan nacelle 66 and the core nacelle 64. The engine 20 generates a high bypass flow arrangement with a bypass ratio in which approximately eighty percent of the airflow which enters the fan nacelle 66 becomes bypass flow. In the disclosed non-limiting embodiment, the bypass flow B communicates through the generally annular bypass flow path 74 and is discharged from the engine 10 through a variable area fan nozzle (VAFN) 76 which defines a variable exit area for the bypass flow.

As the fan blades within the fan section 22 are efficiently designed at a particular fixed stagger angle for an efficient cruise condition, the VAFN 76 is operated to effectively vary the fan nozzle exit area to adjust fan bypass air flow such that the angle of attack or incidence on the fan blades is maintained close to the design incidence for efficient engine operation at other flight conditions, such as landing and takeoff to thus provide optimized engine operation over a range of flight conditions with respect to performance and other operational parameters such as noise levels.

Figure 3:
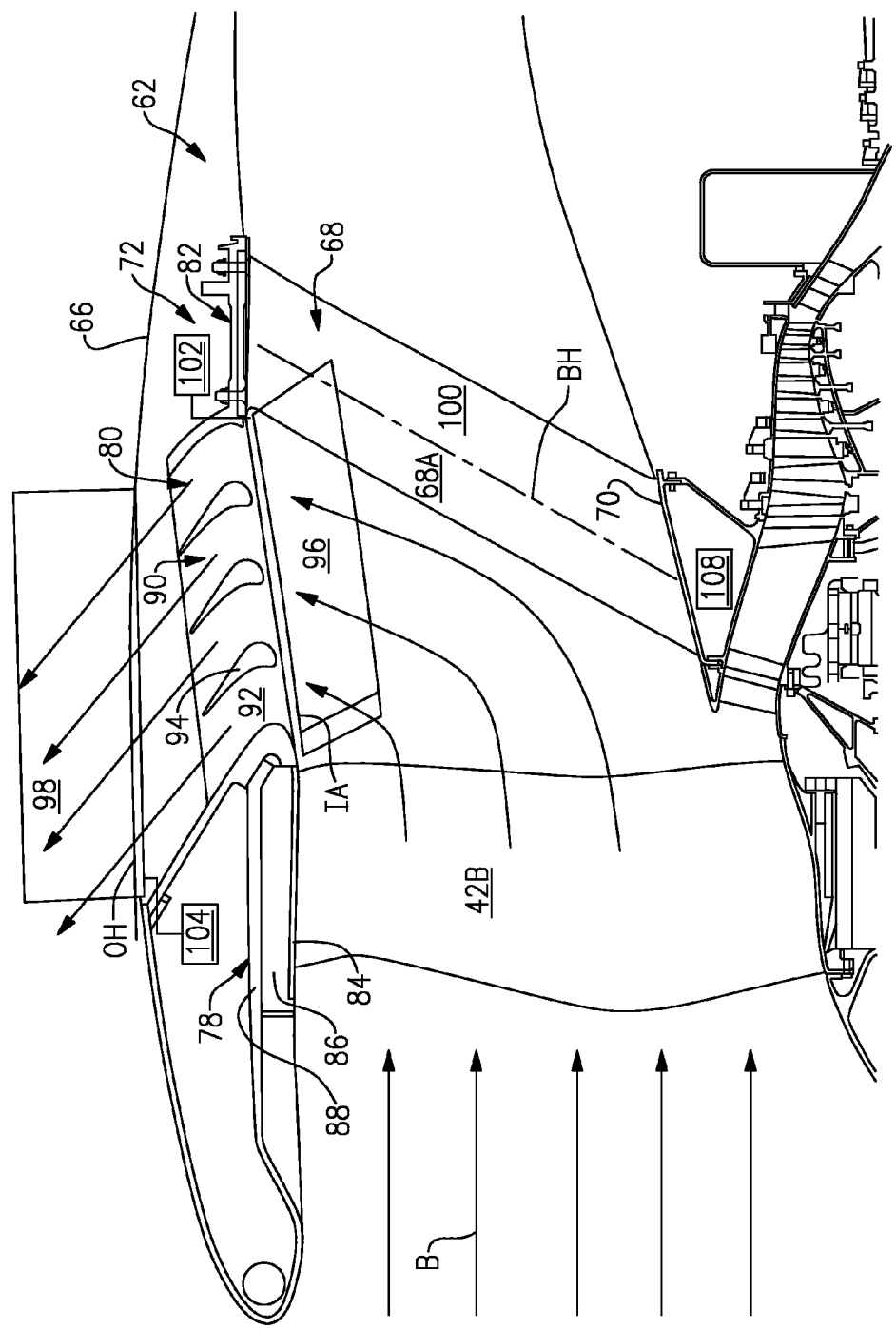
FIG. 3 is an enlarged schematic cross-sectional view of the gas turbine engine illustrating a thrust reverser integral with a fan case.

With reference to FIG. 3, the fan case 72 generally includes a fan blade containment section 78, a thrust reverser cascade section 80 and a FEGV attachment section 82. That is, the fan case 72 may be formed of a multiple of sections formed of carbon fiber, metal alloys, or combinations thereof, which are bolted or otherwise assembled together. Alternatively, the sections may be manufactured as a unitary structure. The thrust reverser cascade section 80 is a structural component which forms an integral portion of the fan case 72. The fan blade containment section 78 generally include an inner layer 84, a ballistic liner 86, and an outer structure 88. The inner layer 84 may be an abradable layer that provides close tolerances with the fan blades 42B. The ballistic liner 86 resists and dulls the ballistic event of fan blade liberation. The outer structure 88 facilitates support of the fan nacelle 66 as well as provide for attachment to the thrust reverser cascade section 80. It should be understood that various assemblies may alternatively or additionally provided with the thrust reverser cascade section 80 upstream of the FEGV attachment section 82.

Figure 4:
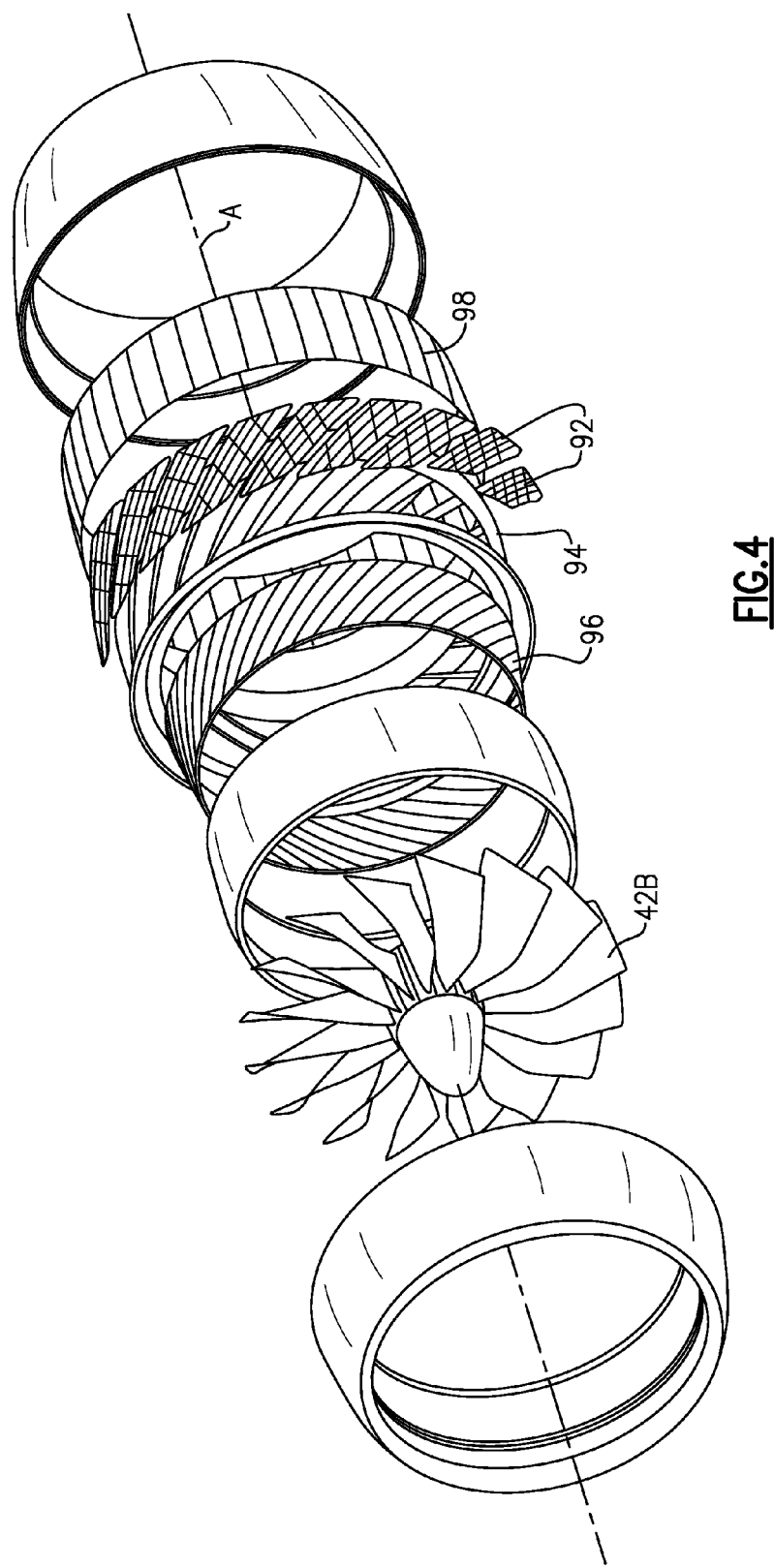
FIG. 4 is a schematic cross-sectional view of the gas turbine engine within a nacelle assembly illustrating the thrust reverser integral with a fan case.

The thrust reverser cascade section 80 includes a thrust reverser cascade 90 with a multiple of ribs 92 and a multiple of cascade airfoils 94. The multiple of ribs 92 may be arranged in a helix formed in a direction equivalent to a rotational direction of the fan 42 between the fan blade containment section 78 and the FEGV attachment section 82 (FIG. 4). The multiple of cascade airfoils 94 are arranged circumferentially about axis A axially forward of the FEGVs 68 to direct bypass flow in a forwardly direction to provide thrust reverse flow. The multiple of cascade airfoils 94 may be integral with or supported by the multiple of ribs 92.

The thrust reverser cascade section 80 are readily located within the fan nacelle 66 aerodynamic lines to provide a relatively short system compared to that of conventional thrust reverser as well as a 360 degree discharge area. Relatively shorter length and smaller diameter nacelles improve fuel burn performance of aircraft engines through, for example, reduced drag, reduced duct pressure loss and reduced nacelle weight. The forward position of the thrust reverser cascade section 80 also facilitates location of the engine 20 farther aft on an aircraft wing closer to wing leading edge and aircraft center of gravity.

The thrust reverser cascade section 80 is located radially outward of a multiple of inner thrust reverser doors 96, radially inward of a multiple of outer thrust reverser doors 98 and axially forward of multiple of fan blocker doors 100 which selectively extend from the FEGVs 68 to selectively form a thrust reverse flow path through the fan nacelle 66. The geared turbofan architecture, in particular, facilitates the increased volume forward of the FEGVs 68 within the fan case 72 to locate the thrust reverser system disclosed herein, however, other engine architectures will benefit as well.

Figure 5:
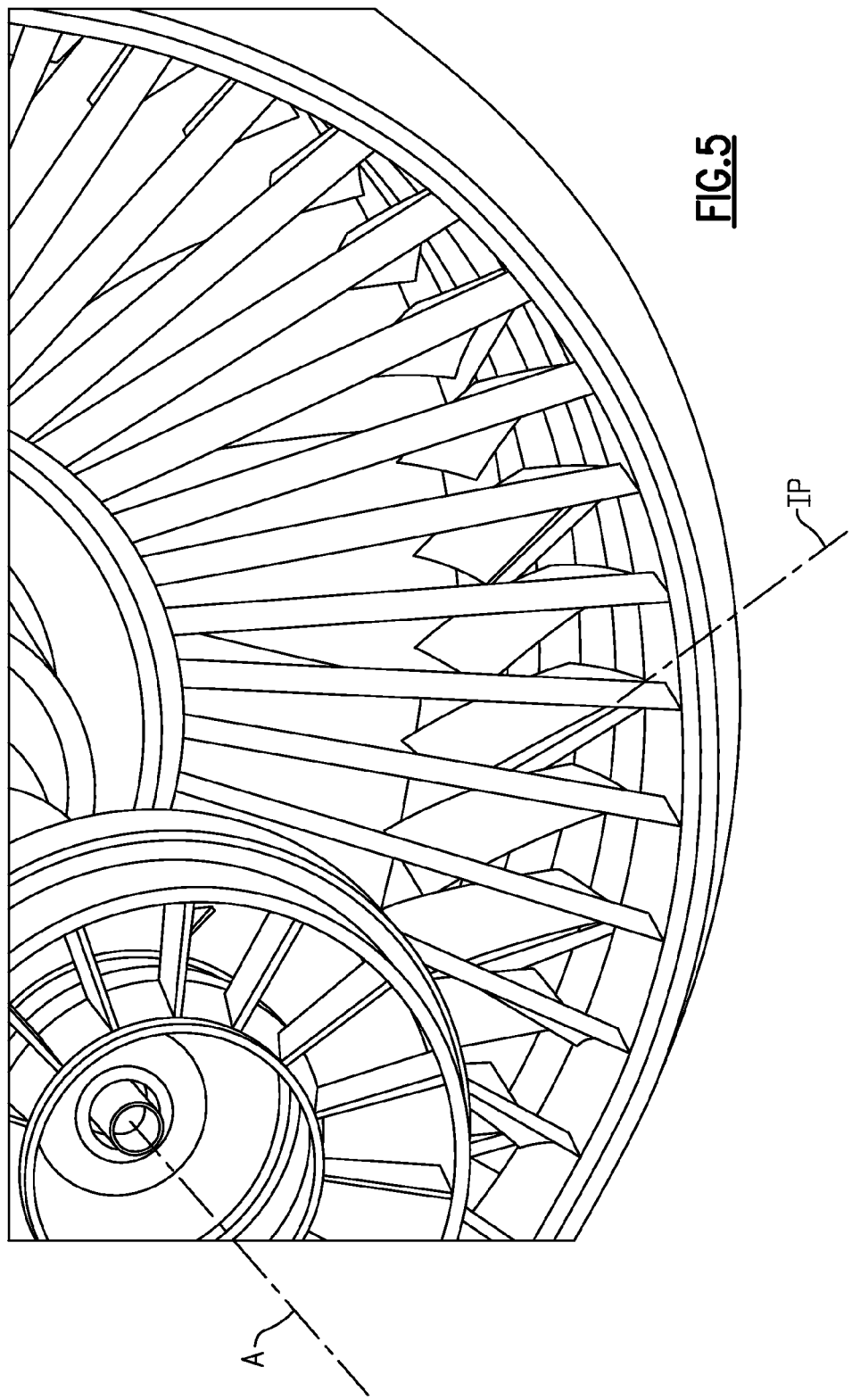
FIG. 5 is an enlarged rear perspective view of the thrust reverser in a thrust reverse position.

Each of the multiple of inner thrust reverser doors 96 may be mounted to one of the multiple of ribs 92 to define an inner hinge axis IH such that each of multiple of inner thrust reverser doors 96 open inwards toward the engine axis A. As the multiple of inner thrust reverser doors 96 are mounted to the ribs 92, the multiple of inner thrust reverser doors 96 may be generally arranged in a helix to facilitate direction of the fan bypass flow into the thrust reverser cascade section 80. That is, the multiple of inner thrust reverser doors 96 may be somewhat transverse to the fan bypass flow path (FIG. 5). The multiple of inner thrust reverser doors 96 are actively deployed and retracted through an actuator system 102 (illustrated schematically). As the multiple of inner thrust reverser doors 96 may be pivotally mounted directly to the fan case 72 and are thereby provided with structural support, it should be understood that various actuator systems may be utilized.

Figure 6:
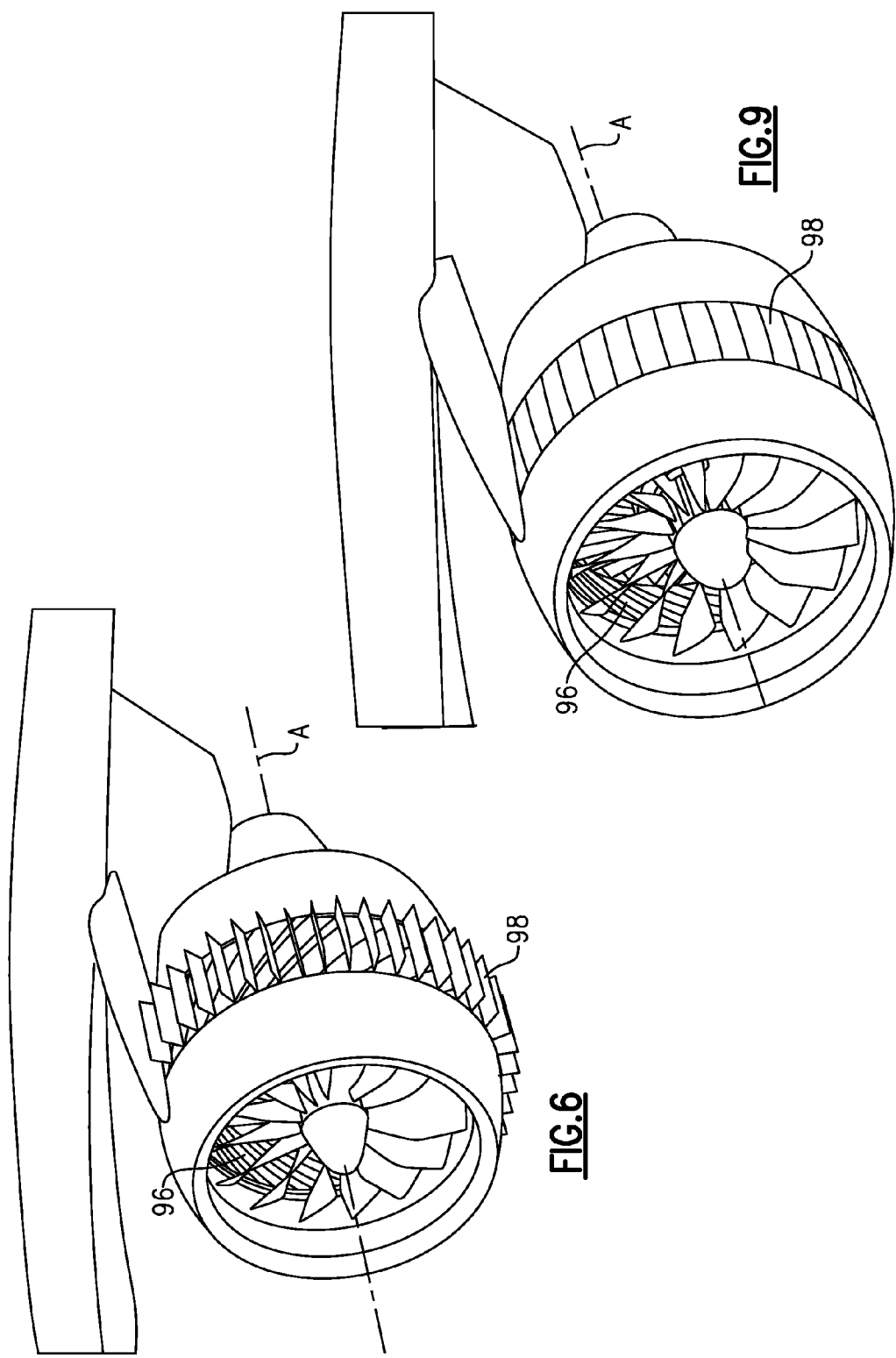
FIG. 6 is an enlarged perspective partial sectional view of the thrust reverser in a thrust reverse position.

Each of the multiple of outer thrust reverser doors 98 may be mounted to the fan nacelle 66 to define an outer hinge axis OH such that each of multiple of outer thrust reverser doors 98 open outward relative the engine axis A (FIG. 6). Although mounted to the fan nacelle 66 in the disclosed non-limiting embodiment, the multiple of outer thrust reverser doors 98 may alternatively or additionally be hingeally mounted directly to the fan case 72 to provide further structural support.

Each of the multiple of outer thrust reverser doors 98 may be arranged circumferentially about an outer mold line of the fan nacelle 66. That is, each of the multiple of outer thrust reverser doors 98 hinge about hinge axis OH which may be generally parallel to the engine axis A.

The multiple of outer thrust reverser doors 98 may be passively deployed due to the direction of the thrust reverse flow therethrough and utilize only a bias system 104 (illustrated schematically) to maintain the multiple of outer thrust reverser doors 98 in a closed position when no thrust reverse flow is selected. Alternatively, the multiple of outer thrust reverser doors 98 may be actively deployed and retracted independently of, or in conjunction with, the multiple of inner thrust reverser doors 96 such that the actuator system 102 may be a common actuator system.

Figure 7:
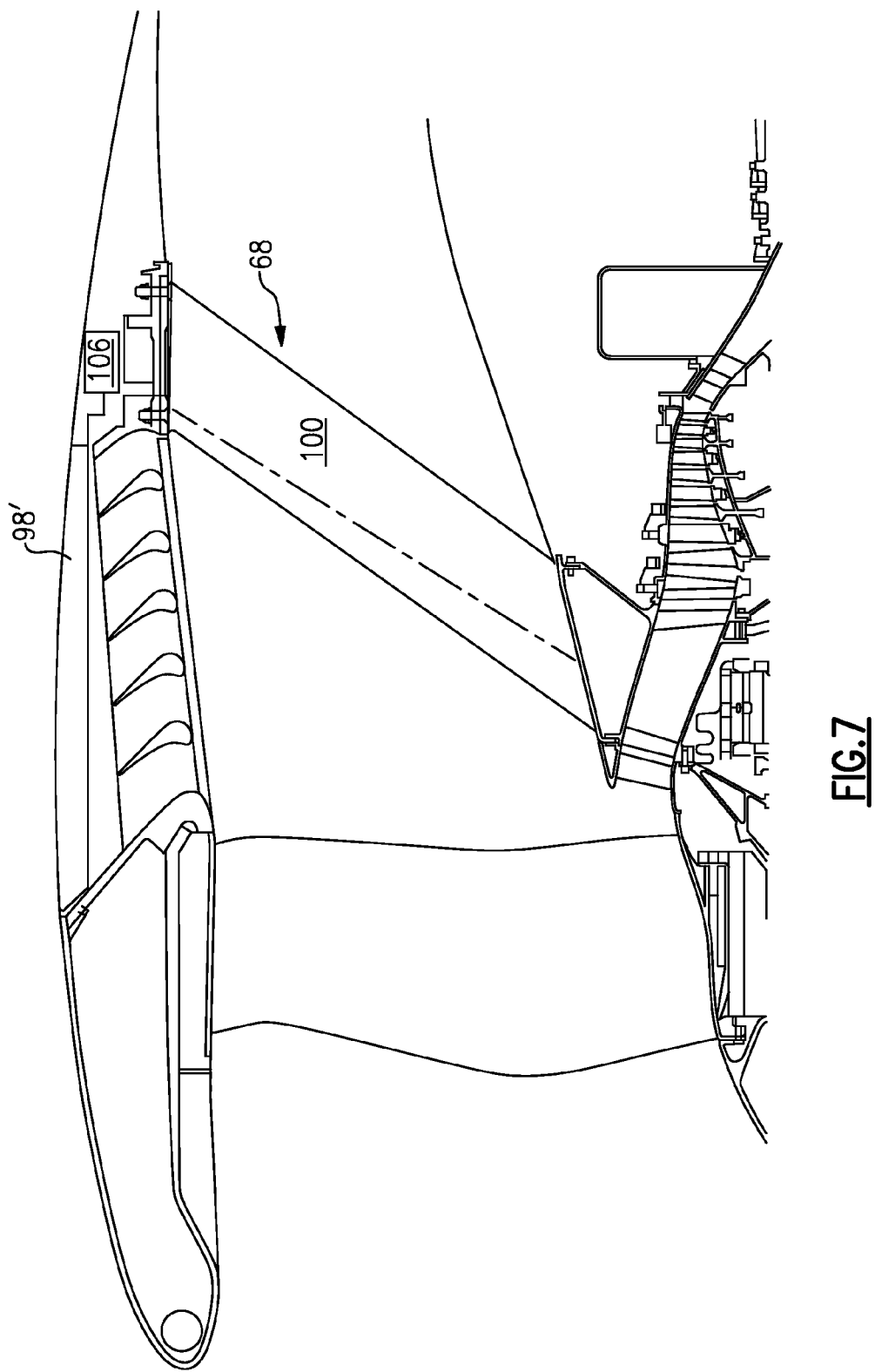
FIG. 7 is an enlarged schematic cross-sectional view of another non-limiting embodiment of a thrust reverser integral with a fan case in a closed position.
Figure 8:
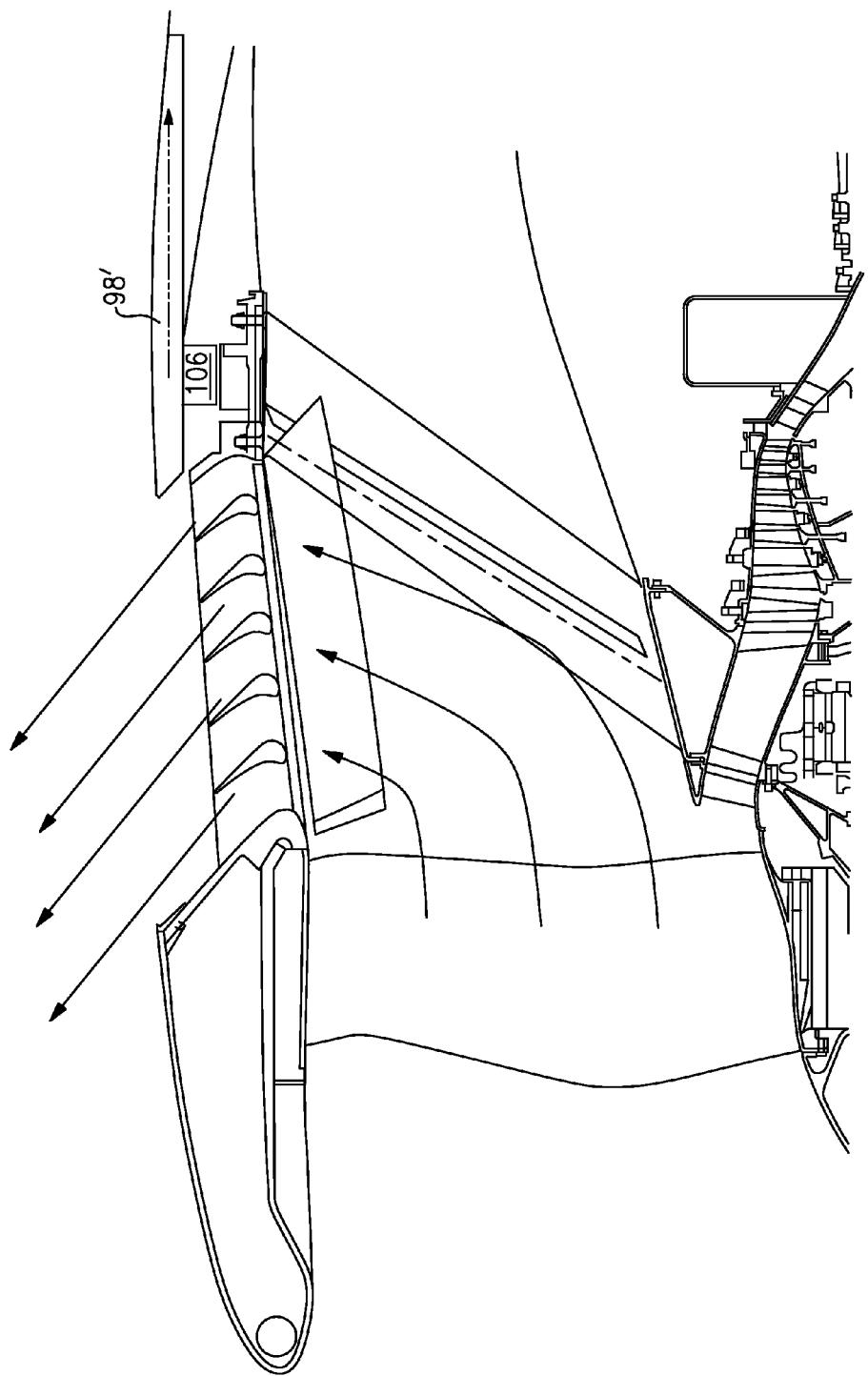
FIG. 8 is an enlarged schematic cross-sectional view of the thrust reverser of FIG. 7 in a thrust reverse position.

In another disclosed non-limiting embodiment, a multiple of outer thrust reverser doors 98' translate generally parallel to the engine axis A (FIGS. 7 and 8). That is, the multiple of outer thrust reverser doors 98' are actively driven to slide between a forward closed position (FIG. 7) and an aftward thrust reverse position (FIG. 8) with an actuator system 106 (illustrated schematically).

Each of the multiple of fan blocker doors 100 are mounted to the FEGVs 68 and are structurally supported thereby. The FEGVs 68 may include a structural support section 68A which extend between and structurally support the core case 70 and the fan case 72. Each of the multiple of fan blocker doors 100 may be mounted to the FEGVs 68 aft of the structural support section 68A to define a blocker hinge line BH about which the fan blocker doors 100 hinge to block the fan bypass flow (FIG. 9).

The multiple of fan blocker doors 100 are actively deployed and retracted through an actuator system 108 (illustrated schematically). As the multiple of fan blocker doors 100 are provided with the structural support of the FEGVs 68, it should be understood that various actuator systems 108 and locations may be utilized such as within the FEGV attachment section 82 or the core case 70 (shown).

In operation, the multiple of inner thrust reverser doors 96 are actively deployed, then the multiple of fan blocker doors 100 are actively deployed such that the fan bypass flow is directed through the thrust reverser cascade section 80 such that the fan bypass flow passively deploys the multiple of outer thrust reverser doors 98. That is, the multiple of outer thrust reverser doors 98 are passively blown open by the thrust reverser directed fan bypass flow. Alternatively, the multiple of outer thrust reverser doors 98 or 98' are actively deployed with, immediately after, or immediately prior to the multiple of inner thrust reverser doors 96 but prior to deployment of the multiple of fan blocker doors 100.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A fan case of a gas turbine engine comprising:
   a fan blade containment section defined about an engine axis;
   a thrust reverser cascade section downstream of said blade containment section, said thrust reverser cascade section including an array of cascade airfoils and a plurality of inner thrust reverser doors radially inwards of said array of cascade airfoils, said inner thrust reverser doors opening inwards toward said engine axis and being arranged in a helix; and
   a Fan Exit Guide Vane section downstream of said thrust reverser cascade section.

2. The fan case as recited in claim 1, wherein said fan blade containment section includes an abradable layer.

3. The fan case as recited in claim 1, wherein said thrust reverser cascade section includes a multiple of ribs which support a multiple of cascade airfoils.

4. A fan section of a gas turbine engine comprising:
   a fan case defined about an engine axis;
   a multiple of Fan Exit Guide Vanes attached to said fan case; and
   a thrust reverser cascade section upstream of said multiple of Fan Exit Guide Vanes, said thrust reverser cascade section including an array of cascade airfoils arranged among a plurality of ribs that are in a helix arrangement and a plurality of inner thrust reverser doors radially inwards of said array of cascade airfoils, said inner thrust reverser doors opening inwards toward said engine axis and being arranged in a helix.

5. The fan section as recited in claim 4, wherein at least one of said multiple of Fan Exit Guide Vanes supports a fan blocker door.

6. The fan section as recited in claim 4, wherein each of said multiple of Fan Exit Guide Vanes supports a fan blocker door.

7. The fan section as recited in claim 4, further comprising a plurality of outer thrust reverser doors radially outwards of said array of cascade airfoils, wherein said plurality of outer thrust reverser doors axially slide generally parallel to said engine axis.

8. A gas turbine engine comprising:
   a fan case defined about an engine axis;
   a core case defined about said engine axis;
   a multiple of Fan Exit Guide Vanes attached to said fan case and said core case;
   a thrust reverser cascade section upstream of said multiple of Fan Exit Guide Vanes, said thrust reverser cascade section including an array of cascade airfoils, a plurality of inner thrust reverser doors radially inwards of said array of cascade airfoils, said inner thrust reverser doors opening inwards toward said engine axis and being arranged in a helix, and said array of cascade airfoils being arranged among a plurality of ribs that are in a helix arrangement.

9. The gas turbine engine as recited in claim 8, further comprising a fan nacelle mounted to said fan case, said fan nacelle at least partially defined by a multiple of outer thrust reverser doors.

10. The gas turbine engine as recited in claim 8, further comprising a multiple of outer thrust reverser doors that axially slide generally parallel to said engine axis.

11. The gas turbine engine as recited in claim 8, further comprising a multiple of outer thrust reverser doors that hinge about an outer door axis generally parallel to said engine axis.

12. The fan case as recited in claim 1, wherein said inner thrust reverser doors are pivotable about respective inner door axes that are inclined to said engine axis.

13. The fan case as recited in claim 12, wherein said array of cascade airfoils is arranged with respect to a plurality of cascade ribs that are also arranged in a helix.

14. The fan case as recited in claim 13, further comprising a plurality of outer thrust reverser doors radially outwards of said array of cascade airfoils.

15. The fan case as recited in claim 14, wherein said plurality of outer thrust reverser doors are pivotable about respective outer door axes that are substantially parallel to the engine axis.

16. The fan case as recited in claim 14, wherein said plurality of outer thrust reverser doors are passively deployable in response to a thrust reverse airflow.

17. The fan case as recited in claim 16, wherein said plurality of outer thrust reverser doors are biased toward a closed position in absence of the thrust reverse airflow.

18. The fan section as recited in claim 4, wherein the plurality of inner thrust reverser doors are pivotable about respective inner door axes that are inclined to said engine axis.

19. The fan section as recited in claim 18, further comprising a plurality of outer thrust reverser doors radially outwards of said array of cascade airfoils, wherein said plurality of outer thrust reverser doors are pivotable about respective outer door axes that are substantially parallel to the engine axis.

20. The fan section as recited in claim 19, wherein said plurality of outer thrust reverser doors are passively deployable in response to a thrust reverse airflow.

\* \* \* \* \*